United States Patent [19]

North

[11] 3,967,970

[45] July 6, 1976

[54] CELLUATION METHOD AND PRODUCT
[76] Inventor: John W. North, Decatur, Ga.
[22] Filed: Dec. 27, 1974
[21] Appl. No.: 536,846

Related U.S. Application Data

[63] Continuation of Ser. No. 293,810, Oct. 2, 1972, abandoned.

[52] U.S. Cl. .............................. 106/41; 106/40 R; 106/73
[51] Int. Cl.² ...................................... C04B 35/00
[58] Field of Search ..................... 106/41, 73, 40 R; 264/44, 43

[56] References Cited
UNITED STATES PATENTS

| | | | |
|---|---|---|---|
| 2,485,724 | 10/1949 | Ford | 106/41 X |
| 2,670,299 | 2/1954 | Jensen | 106/41 |
| 3,307,957 | 3/1967 | Cooper | 106/41 X |
| 3,536,503 | 10/1970 | Heidrich | 106/41 |
| 3,666,506 | 5/1972 | Cowan | 106/41 |

*Primary Examiner*—Winston A. Douglas
*Assistant Examiner*—John F. Niebling
*Attorney, Agent, or Firm*—Newton, Hopkins & Ormsby

[57] ABSTRACT

A method of preparing cellulated or bloated products from natural material sources using clay or a clayey material as a starter and using treating agents capable of being placed in aqueous solutions for absorption into ultimate particles of the material.

7 Claims, No Drawings

CELLUATION METHOD AND PRODUCT

This is a continuation of application Ser. No. 293,810, filed 10-2-72, now abandoned.

DESCRIPTION OF THE INVENTION

The present invention relates to methods and product of the methods for producing cellulated or bloated objects for use in the building industry and in other places where heat insulation, fire resistance, and lightness of weight are prerequisites.

It is a general object of the invention to provide a method of producing a cellulated or bloated mineral material from a natural source such as clayey material.

It is a further object of the invention to provide a cellulated product produced in accordance with the above method.

Other objects and advantages of the invention will be apparent from the following description of a preferred method and a preferred product.

PRIOR ART

Foamed glass has been made previously and the patents to Ford 2,485,724 and Connelly 3,174,870 are representative of the prior art.

Ford 2,485,724 proposed to use various minerals including nephelene syenite, feldspar, Albany slip clay, albite, and spodumene and started out by first grinding these particles to microscopic size, for example, so it will pass some mesh of 100 to 300 per inch, or even finer. Ford also proposed to use a gas producing agent such as calcium sulphate, sodium sulphate, magnesium sulphate, antimony trioxide or arsenic trioxide as well as calcium carbonate for reaction which would occur at about or slightly above the sintering temperature, i.e. 1500° to 1700°F.

The fluxing agents proposed by Ford are sodium peroxide, sodium oxide, potassium oxide, or an oxide-forming compound such as soda ash which would also tend to cause local bloating or the production of non-uniform porosity or cellulation.

Ford also states that reducing agents such as urea, sugar, dextrose or molasses can be substituted for carbon black and may be dissolved in water before mixing so as to produce a moist mass for introduction into a furnace.

The patent to Connelly, 3,174,870 refers to the patent to Ford and proposes to improve upon it by using naturally found minerals such as the alkaline-alumina-silicate materials, or feldspar materials including granite, rocks, minerals and various natural glasses, which are ground to microscopic size (about 400 mesh).

Connelly requires a foaming agent which is oxygen stable below 1050°C., and adds an oxygen supplying agent such as an alkaline sulphate. As a reducing agent finely divided metals, metal carbides and metal sulphides are listed which are oxygen stable to about 1100°C.

Granite rock is given in one example and Buckingham feldspar is listed as another example.

In both of the above prior art patents there will be localized soft spots on the surface of particles which will allow gas to escape and these soft spots will be caused by lack of homogeneous distribution of iron in some materials. The poorly distributed iron (or even combined iron) will react to the carbon particles of the carbon black to cause early local melting. Localized soft spots are also caused by discrete particles of fluxing materials such as NaO or KO which do not melt and disperse.

DESCRIPTION OF THE INVENTION

Applicant has discovered that a clayey material such as clay, shale, or bentonite provides a natural and widely available material in which there is a uniform and wide dispersion of a natural amount of iron in the form usually of iron oxide ($Fe_2O_3$). The natural size of the particles or pellets that are present or can be obtained by a mulling operation are of one to two mm. in diameter down to fine dust and provide a satisfactory starting material. This starting material is prepared, for example, by dissolving clay in water and then screening it to remove certain impurities. Then the clay solution is subjected to a de-watering filter after which the material is dried. A water solution containing the flux and the carbon material is then added to the clay starting material including the widely dispersed iron component and mixed as described below. For example, a water solution of hydroxide acts as flux and the sugar acts as a source of carbon. The mixture is put into a muller and mulled about 15 minutes to produce moist macroscopic pellets or particles about one to two mm. in diameter, as a starting material.

The flux used should be one which is soluble in water and which is meltable at a relatively low temperature (at about 700°F. in the case of sodium and potassium hydroxide) which is capable of being reabsorbed in its molten state at a temperature below its reaction temperature so that it is capable of coating the ultimate particles or plates of the clay. Both hydroxides and phosphates of sodium, potassium and lithium are suitable but sodium and potassium hydroxide are preferred because of cost. Sugar, molasses or urea also can be added to the solution as a source of carbon and when in solution will penetrate and coat the ultimate particles or pellets. In subsequent heating when the water of the solution evaporates, sugar is left on the surface of the pellets or particles and the sugar melts during continued heating and reabsorbs into the pores, when the sugar is further decomposed by heating it leaves a carbon residue on substantially each ultimate particle. This provides for a more uniform fluxing action and enables the fine ultimate particles to sinter more evenly and trap gases in smaller more regular uniform bubbles as a result of the steady access of the carbon and iron to each other.

Another feature of this invention is the fact that the prepared material is put directly into a kiln at full temperature of about 2100° to 2300°F., and carried directly up to a melting temperature as fast as it can absorb heat. Directly upon melting, the flux can reach the iron in the clay and react to form gas so that cellulation or bloating occurs so that a very uniform cellulation or bloating action is obtained. The bloating occurs progressively from the outer surface of the material inwardly as melting occurs.

The time of processing in a kiln may be for from ten minutes to two hours with the ten minutes being used for a one inch thick tile, for example, and the two hours being used for a thicker 8 inch thick slab.

The material may be introduced into a conventional roller kiln as a layer and is carried on thin plates either with or without a layer of sand bonded thereon. Side angles loosely fixed in place may be employed to confine loosely the layer of material.

During the heating the material contracts and coalesces and at the time the sodium hydroxide, for example, melts it is readmitted to be reabsorbed into each macroscopic particle and then upon melting of the ultimate particle reacts with the iron in the ultimate particles to form a gas, and bloating or cellulation occurs throughout the mass.

Subsequently the bloated material is cooled and annealed. The cooling and annealing lehrs are not described, as the cooling and annealing of glassware and ceramics is a well known art.

When a continuous slab is made, it is cut into desired lengths after cooling sufficiently, the width being as wide as the kiln will accommodate. The thickness is chosen by consideration of firing time and uniformity, volume of production desired, ease of fabrication, etc. After complete cooling through the annealing lehr, the sheet is cut to shapes and dimensions as desired, analogously to cutting boards, beams or parquet blocks from a wood log. The finished product may be (a) a two inch square one-eighth inch thick to be glazed for wall or floor tile, or it may be (b) a wall board four feet wide and long enough to reach from floor to ceiling or to span the width of a room as a ceiling board or roof slab. The sheet as made in the kiln may be just the thickness desired for a roof tile or a building facing, and in fabrication into shapes for the market, the natural fired texture and color of the top surface is left on. In firing, various devices for obtaining surface effects are known in the arts, such as materials added on top before firing and/or spot atmosphere regulation.

The following are examples of bloated material prepared in accordance with the above described process, and in all cases not specifically excepted the firing is done in a non-oxidizing atmosphere.

1. 100 parts Black Hills bentonite (parts are by weight)
1 part granulated cane sugar
5 parts NaOH
30 parts tap water Dissolve the sugar and then the NaOH in water and then mix with the aggregate in a muller-mixer. Rub through a 10 mesh screen to pelletize. Put in pan as described above and place in hot kiln at about 2160°F. for 30 minutes. Take the pan from the kiln and place in an annealing oven and cool slowly to below 300°F. before removing to cool completely.

The resulting block has well formed cells, mostly about 1 mm. in diameter, and a density of about 12 pounds per cubic foot, and glassy appearance.

Approximately the same results are obtained with the equivalent mol percent of KOH replacing the NaOH, or with an equivalent mixture of NaOH and KOH.

2. 100 parts surface clay from near Corona, California, reddish colored.
1 part granulated sugar
9 parts NaOH
17 parts tap water Mix and fire as the first example, except firing temperature is about 2300°F.

This gives a block of about 30 pounds per cubic foot, and fine cells.

3. Same as example 2, except that the sugar is reduced to 0.06 parts. The resulting block has finer cells and a density of about 42 pounds per cubic foot.

4. 100 parts Black Hills bentonite
1.5 parts sugar
15 parts trisodium phosphate

Place in prepared pan in kiln at 2200°F. for 30 minutes. The resulting block has fine cells and a density of about 22 pounds per cubic foot.

5. 100 parts Black hills bentonite
4 parts sugar

Mix and fire as in first example, except temperature is about 2300°F. The resulting block has a density of about 20 pounds per cubic foot, and is cellular, but with porous cell walls. It is permeable to gases and will absorb water.

The block is refired in an oxidizing atmosphere for time and temperature to burn out much of the carbon. The block becomes more permeable and changes color to light reddish brown.

While I have described a preferred method of the invention, it will be understood that the invention is capable of variation and modification from the form shown so that the scope thereof should be limited only by the proper scope of the claims appended hereto.

I claim:

1. A method of preparing a bloated cellular product comprising:
   a. admixing naturally occuring clayey material particles and an aqueous solution having dissolved therein a non-oxidizing flux for said material and a bloating agent containing reactable carbon under such conditions that the solution is uniformly dispersed and absorbed into the clayey material particles;
   b. heating said admixture under temperature and time conditions sufficient to drive the liquid from said solution so as to cause the dissolved flux and bloating agent to migrate with the water to the surface of the particles and be deposited thereon as the water is driven off of the particles;
   c. continuing the heating of said admixture under temperature conditions sufficiently high that said flux and said bloating agent become molten and flow into the particles; and
   d. still further continuing the heating of said admixture under elevated temperature conditions above 2100°F and sufficiently high and for a sufficient length of time that the oxygen contained in said naturally occurring clayey material reacts with said carbon to produce an oxide of carbon in gaseous form and said clayey material particles become viscous, said bloating agent being so evenly dispersed in said viscous clayey material that the gases are trapped in said material, forming a cellular structure in said clayey material.

2. A method as claimed in claim 1 wherein said clayey material is selected from the group consisting of clay and shale.

3. A method as claimed in claim 1 wherein the total time period of the heating steps ranges from 10 to 120 minutes.

4. A method as claimed in claim 1 wherein said fluxing agent is selected from the group consisting of the hydroxides and phosphates of sodium, potassium and lithium.

5. A method as claimed in claim 4 wherein said bloating agent is sugar.

6. A bloated cellular product produced in accordance with the method of claim 1.

7. A method as claimed in claim 1 wherein said clayey material is bentonite.

* * * * *